March 23, 1926.
J. ABADIE
ROACH TRAP
Filed Sept. 18, 1924   2 Sheets-Sheet 1
1,578,061
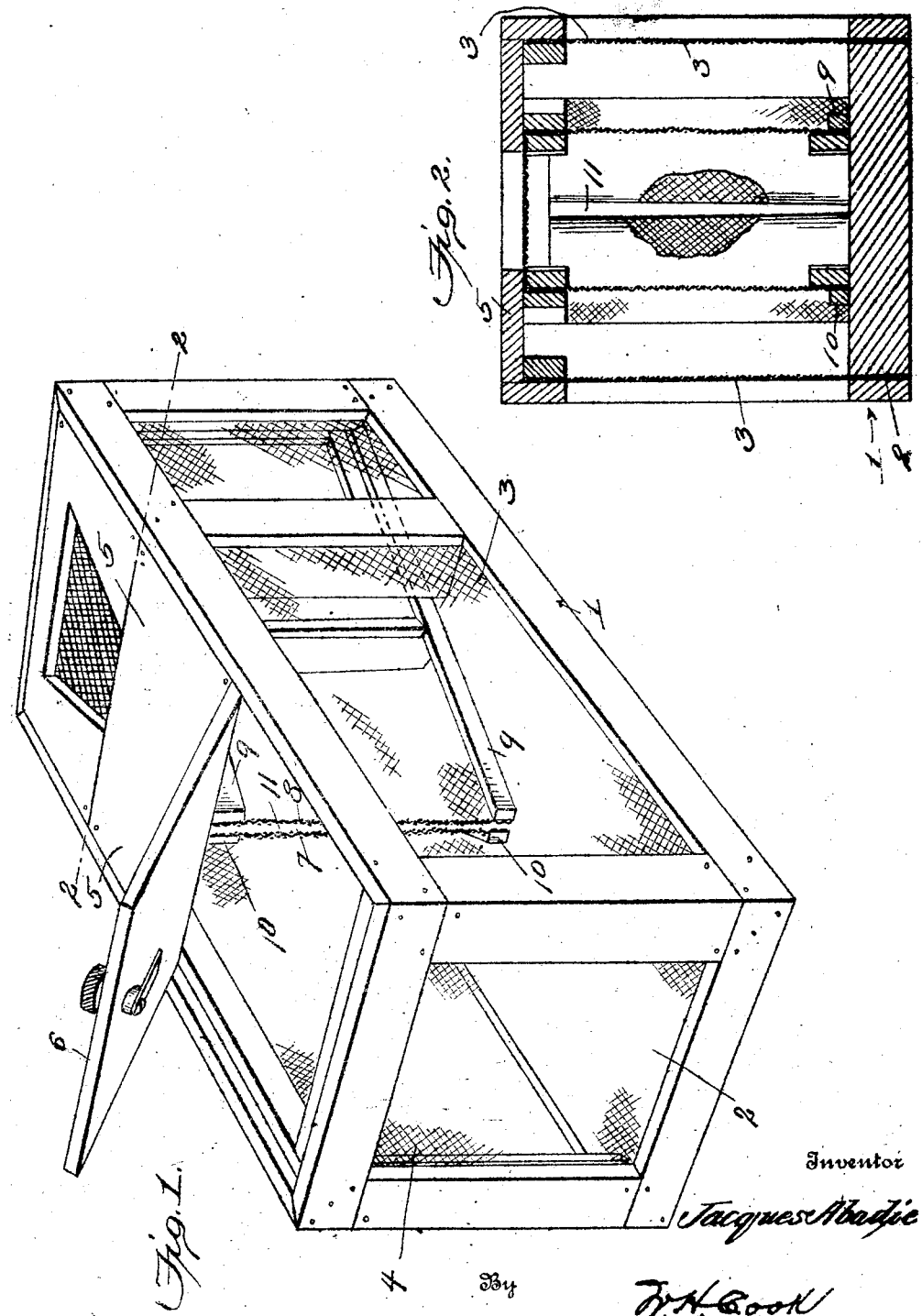

March 23, 1926. 1,578,061
J. ABADIE
ROACH TRAP
Filed Sept. 18, 1924 2 Sheets-Sheet 2
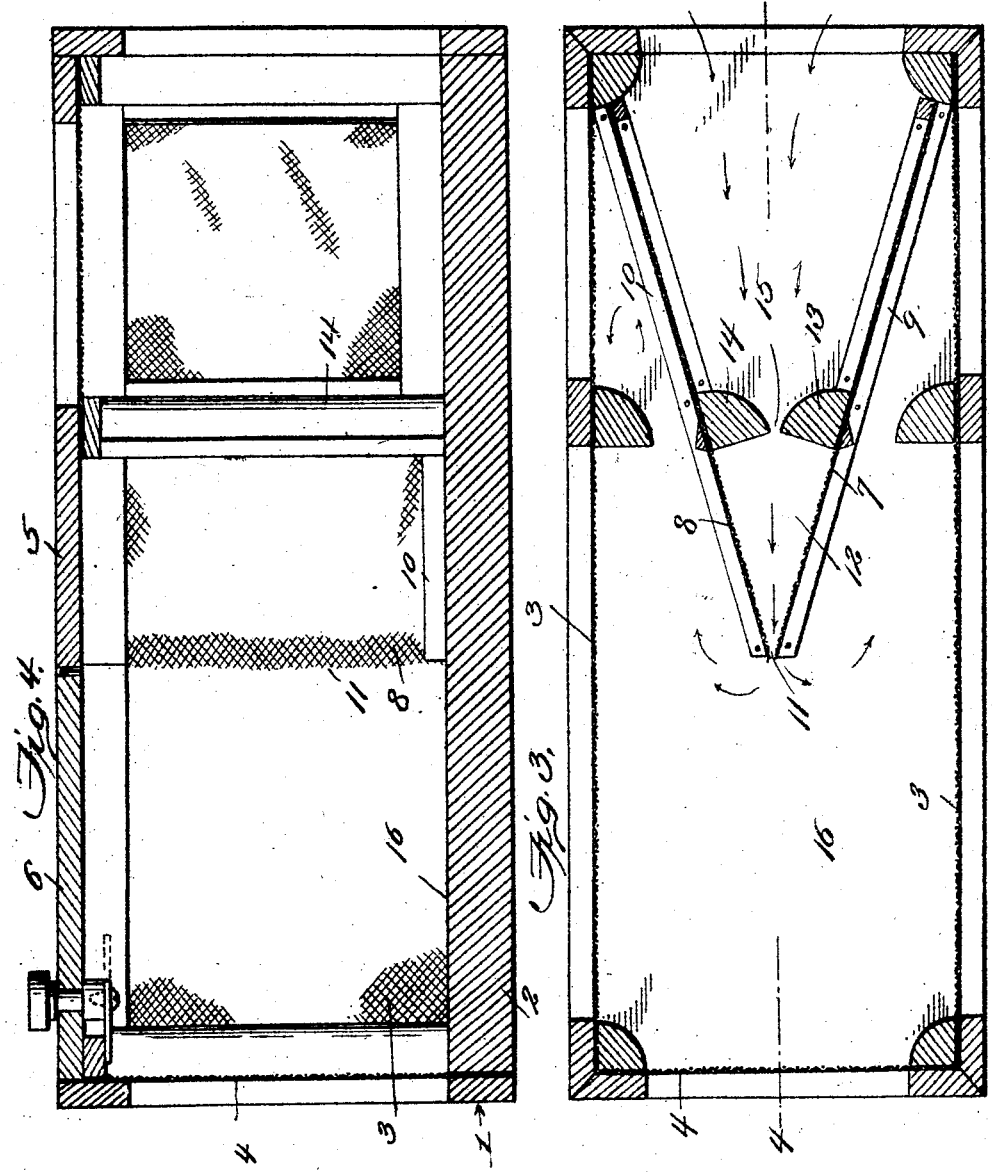

Patented Mar. 23, 1926.

1,578,061

UNITED STATES PATENT OFFICE.

JACQUES ABADIE, OF NEW ORLEANS, LOUISIANA.

ROACH TRAP.

Application filed September 18, 1924. Serial No. 738,485.

*To all whom it may concern:*

Be it known that I, JACQUES ABADIE, a citizen of the United States, residing at New Orleans, in the parish of Orleans, State of Louisiana, have invented certain new and useful Improvements in Roach Traps, of which the following is a specification.

This invention relates to traps intended particularly for catching crawling insects such as roaches and the like. It contemplates the provision of a cage for retaining the roaches having an entrance which may take the form of a wedge shaped passage having inwardly convergent side walls and terminating in a vertical slot characterized by its being narrow at the bottom to prevent the passage of roaches and widening gradually toward the top to admit, at various levels roaches of different size, this construction being adapted in recognition of the preference which roaches have of going into a crack which is just wide enough for them to sequeeze through rather than trust themselves to pass through openings of relatively large size.

Another object of the invention is the provision of an ante-chamber in front of the entrance to the cage and in communication therewith, through which the roaches must pass before entering the cage, said ante-chamber being of so small a size as to cause the roaches to realize the restriction of their freedom of movement and to seek avenues of escape. Failing to find the way by which they entered into the ante-chamber the roaches will be thrown into a mild panic, proceeding to climb the walls of the ante-chamber and incidentally finding their way through the slot at the inner end of the wedge shaped passage at such levels as will enable them to squeeze through into the cage. The latter is preferably so relatively large that the roaches will not appreciate their state of imprisonment for some time, so that they will congregate on the floor of the cage in the quiet enjoyment of the bait with no inclination to climb the walls of the cage, and therefore unable to get out.

Other objects of the invention will be disclosed as the description of the invention develops.

In the drawings:—

Figure 1 is a perspective view of my improved roach trap.

Figure 2 is a section taken along the line 2—2 of Figure 1, looking inwardly.

Figure 3 is a cross section of the roach trap taken in an intermediate plane parallel with the base.

Figure 4 is a longitudinal section taken along the line 4—4 of Figure 3.

Referring now in detail to the several figures, the numeral 1 represents the frame work of a rectangular enclosure which is preferably formed with a solid bottom 2 the sides 3 and rear ends 4 of which may be made of reticulated fabric such as wire screen. The top of the trap may be made in any suitable manner, one embodiment being shown in Figure 1 in which a portion of the top is permanently closed as shown at 5 and another portion 6 being hinged so that it may be opened for emptying the roaches after they have been killed.

The front end of the roach trap is formed with a wedge shaped passage having inwardly converging side walls 7 and 8 preferably formed of wire mesh fabric and secured to the top and bottom of the trap by suitable battens 9 and 10. Said wedge shaped passage terminates inwardly in a vertical slot 11, and the converging walls are slightly inclined so that the slot 11 is wider at the top than at the bottom, the width of said slot being so determined that it is too narrow at the base to permit the passage of roaches, but wide enough at various levels to permit roaches of different sizes to squeeze through.

An ante-chamber 12 is formed in front of the slot 11 by means of the vertically arranged members 13 and 14 which contact with the converging walls of the wedge shaped passage and form a constriction across the latter, leaving a passage 15 which is sufficiently wide to admit roaches of all sizes to the ante-chamber, but preferably no wider. The faces of the members 13 and 14 which are presented toward the entrance of the trap are preferably curved so as to accord with the divergent arrangement of the wedge shaped passage in directing roaches into the ante-chamber. The volume of the ante-chamber 12 is relatively small compared with the capacity of the cage, or roach retaining chamber 16 of the trap.

The trap is operated by placing suitable bait on the floor of the cage 16. This may be introduced conveniently through the opening closed by the door 6. A roach entering the trap through the open end 4 will be directed into the ante-chamber by the converging side walls 8 and 9 and the curved faces of the members 13 and 14. Finding himself in the ante-chamber the roach will soon sense the restriction of his freedom, due to the small size of the ante-chamber and will run about trying to find a way out. The passage 15 being a small part of the perimeter of the ante-chamber the chance of the roach finding said passage is remote so that he will be thrown into a mild panic by his failure to escape and will proceed to climb the sides of the walls 7 and 8. These being convergent inwardly ultimately lead the roach to the slot 11 which he enters at a level where it is just wide enough to accommodate the passage of his body. The cage 16 being relatively spacious the roach will consider himself at large and proceed to the enjoyment of the bait, confining his activities to crawling about the floor of the cage and being unable to escape due to the narrowness of the slot 11 at its base. When a sufficient number of roaches have been lodged in the cage to justify attention to the trap, it may be immersed in hot water, or the roaches otherwise suitably destroyed, after which they may be emptied from the trap by opening the door 6.

While I have above described what I have found to be a very practical embodiment of my improved roach trap it is nevertheless to be understood that the roach trap may also be exemplified in numerous other alternative constructions and I accordingly reserve the right of adopting all such legitimate changes as may be fairly embodied within the spirit and scope of the invention as claimed.

Having described my invention what I claim as new and desire to secure by Letters Patent, is:—

1. A roach trap comprising a cage, an entrance thereto including inwardly convergent side walls the inner edges of which are so relatively arranged as to form a V-shaped slot sufficiently narrow at its lower portion to prevent the passage of roaches therethrough and wide enough adjacent its upper portion to admit roaches of the largest size, means for constricting said entrance in front of said slot, forming an ante-chamber having a slot sufficiently wide to admit roaches of all sizes.

2. A roach trap comprising a cage, an entrance thereto including inwardly convergent side walls of reticulated wire fabric, the inner ends of said walls being so relatively arranged as to provide a V-shaped slot sufficiently narrow at its lower portion to prevent passage of roaches therethrough but wide enough adjacent its upper portion to admit roaches of all sizes, vertical members arranged in said entrance adjacent the side walls intermediate the ends thereof forming a constriction, with a slot therebetween sufficiently wide to admit roaches of all sizes, said constriction defining an ante-chamber in front of the V-shaped slot.

In testimony whereof I have hereunto set my hand.

JACQUES ABADIE.